US006526176B1

(12) United States Patent
Kovacevic et al.

(10) Patent No.: US 6,526,176 B1
(45) Date of Patent: Feb. 25, 2003

(54) EFFICIENT PROCESSING OF QUADTREE DATA

(75) Inventors: Jelena Kovacevic, New York, NY (US); Martin Vetterli, Brandvaux (CH); Laurent Lorenzo Balmelli-Quadranti, St-Blaise (NE) (CH)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/425,149

(22) Filed: Oct. 21, 1999

(51) Int. Cl.[7] .................................................. G06K 9/36
(52) U.S. Cl. ....................................................... 382/240
(58) Field of Search ................................. 382/240, 226

(56) References Cited

U.S. PATENT DOCUMENTS 5,228,098 A * 7/1993 Crinon et al. ................ 382/240
6,356,665 B1 * 3/2002 Lei et al. ...................... 341/79

OTHER PUBLICATIONS

Gargantini. "An Effective Way to Represent Quadtrees." Communications of the ACM, vol. 25, No. 12, Dec. 1982, pp. 905–910.*
Samet. "The Quadtree and Related Hierarchical Data Structures." Computing Surveys. vol. 16, No. 2, Jun. 1984, pp. 187–260.*
Clarke. Digital Compression of Still Images and Video. Academic Press, 1995, pp. 195–205.*
Zemanek. "Parallel Set Operations with Visual Data." Proc. of the 22nd EUROMICRO Conference, EUROMICRO 96, Beyond 2000: Hardware and Software Design Strategies, Sep. 1996, pp. 529–536.*
Seetharaman et al. "Image Processing in a Tree of Peano Coded Images." Proc. fourth IEEE Int. Workshop on Computer Architecture for Machine Perception, Oct. 1997, pp. 229–234.*
Gaede et al. "Multidimensional Access Methods." ACM Computing Surveys, vol. 30, No. 2, Jun. 1998, pp. 170–231.*
Samet et al, *Technical Report, Computer Science Dept., Center for Automation Research, University of Maryland,* CS–TR–3900, Apr., 1998.

* cited by examiner

*Primary Examiner*—Jon Chang
(74) *Attorney, Agent, or Firm*—Henry T. Brendzel

(57) ABSTRACT

Processing of quadtree data structures is significantly improved with the use of an indexing that is arranged to insure that the index value of a node in column/row i and column/row j differs from the index value of a node in column/row k and row/column i by a value that is constant. With such an indexing arrangement, no indexing information, or pointer information, needs to be stored. Moreover, traversal from any node to any other node can be accomplished with a single calculation followed by a single traversal which, in the context of this disclosure, is considered to be a single step.

8 Claims, 4 Drawing Sheets

EFFICIENT PROCESSING OF QUADTREE DATA

BACKGROUND OF THE INVENTION

This invention relates to data processing and, more particularly, to processing of data having a quadtree topology.

The quadtree is a data structure that is widely used in image processing, computer graphics, data compression, and other applications. The quadtree can be viewed as a tree in which each node has at most four children. FIG. 1 illustrates an image where each picture area can be divided into four parts, and each resulting area can be recursively divided to thus yield areas of, effectively, any desired small size. It should be kept in mind that although the following discussion illustratively speaks in terms of an image, which is a 2-dimensional object, the principles disclosed herein apply to a much broader range of useful applications.

To efficiently process the FIG. 1 image, it might be advantageous to subdivide the image into large areas in portions of the image that change little, and to subdivide the image into small areas in portions of the image that change a lot. The same situation exists in topographical rendering problems, where the topography of a three-dimensional surface (e.g., a hill, a face, a dress) is represented in triangles, and each node of the quadtree stores 8 triangle surfaces oriented in 3-D space.

In processing data that is represented in a quadtree data structure and stored in memory, it is often necessary to traverse the quadtree. Traversing from a child node to the immediately previous parent node is quite simple. Traversing from a child node to an earlier ancestor node is slightly more difficult and more time consuming, but still quite easy. Traversing from some arbitrary node at some level to another arbitrary node in another level, where there is no direct connection between the nodes except by traversing a number of levels up the quadtree, can become quite time consuming. To move to a same-level neighbor in the quadtree can actually require the use of significant processing resources just to find out how to reach that neighbor node (i.e., how high up the tree one needs to traverse, and which branches down one must select).

Prior art attempts at solving this problem are reported on by a number of researchers. In "Finding neighbors of equal size in linear quadtrees and octrees in constant time," *CVGIP: Image Understanding*, 55(3):221–230, May 1992, G. Schrack shows how to travel between neighbor nodes in the quadtree (located at the same level). However, the Schrack method is limited to accessing neighbor nodes. In "Navigating through meshes implemented as linear quadtrees," *Technical Report, Computer Science Dept., Center for Automation Research, University of Maryland*, CS-TR-3900, April, 1998, Samet et al show how to store a particular class of triangulations in a quadtree and how to assign to each triangle a binary index (vector of 0's and 1's) so that neighbor triangles at the same level and neighbors located at a different level can be accessed in constant time. However, the Semet et al method implies storing an explicit index in each quadtree node, which increases the storage requirements and exacerbates what is a critical issue with a linear quadtree.

Further, both works restrict the quadtree traversal to neighbor nodes. Thus, the known art has not solved the general problem of efficiently traversing from one node to any other arbitrary node.

SUMMARY OF THE INVENTION

The deficiencies in the prior art are overcome and a technical advance is realized with a simple, algorithmic, indexing of the quadtree nodes. The indexing is arranged to insure that the index value of a node in column i and row j differs from the index value of a node in row k and column i by a value that is constant, regardless of the value of row j. Similarly, the index value of a node in row j and column i differs from the index value of a node in row k and column i by a value that is a constant, regardless of the value of column i. With such an arrangement, no indexing information, or pointer information, needs to be stored. Moreover, traversal from any node to any other node can be accomplished with a single calculation followed by a single traversal which, in the context of this disclosure, is considered to be a single step.

DETAILED DESCRIPTION

Figure 1:
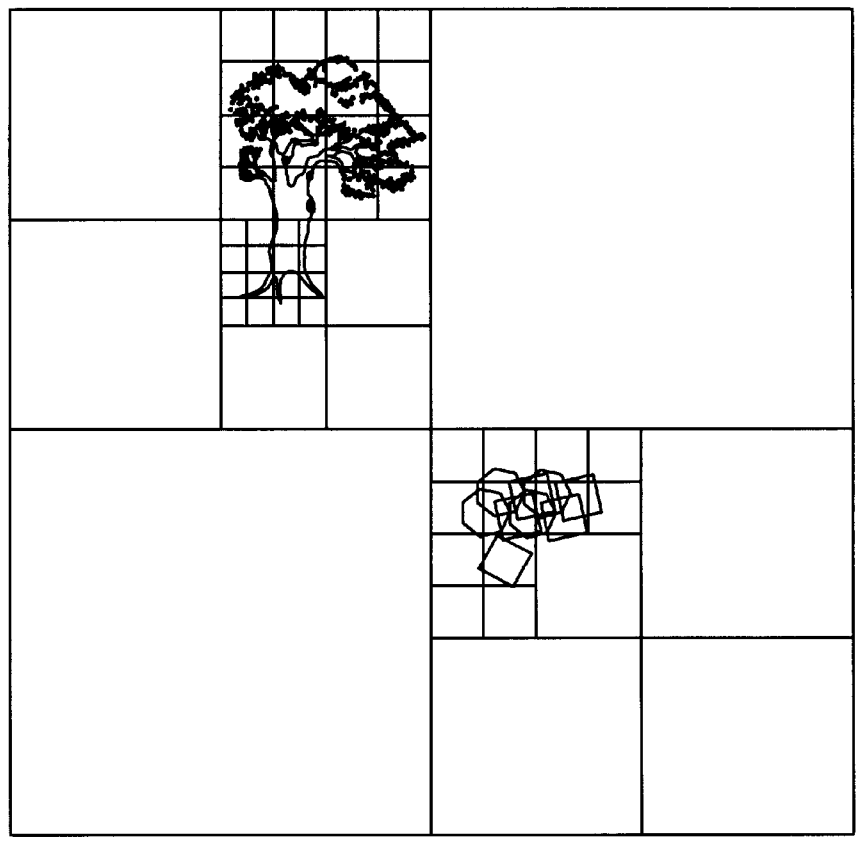
FIG. 1 presents an image, and illustrates how the image may be subdivided into areas of different sizes in conformance with a quadtree data approach.

Consider, for example, an imaging application where a picture such as the one depicted in FIG. 1 needs to be processes. Consider further that the picture was subdivided into a collection of subareas of different sizes, not unlike it is subdivided in FIG. 1, and that an algorithm exists in the hands of the practitioner for traversing the quadtree. The traversal can be within a given level, moving up one or more levels, or moving down one or more levels. In accordance with conventional approaches, each area in the subdivided image is represented by a node in a quadtree. Conversely, each node represents the collection of information about the image in the corresponding subarea. Thus, the entirety of the FIG. 1 image is represented by information associated with a root node. That information is, necessarily, quite coarse from a spatial perspective. It might, for example, specify that the color of van Gogh's Sunflowers picture is "yellow." Subsequent nodes provide information that represent subareas, which reduces the granularity of the information about the picture.

Figure 2A:
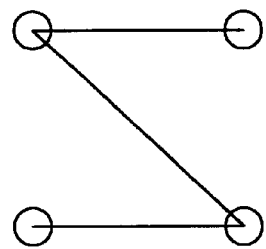
FIGS. 2A and 2B illustrate the two different traversals of a quadtree foursome.
Figure 2B:
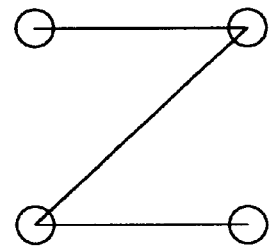

In accordance with the principles disclosed herein, the root node, being designated a level-0 node, is labeled with the lowest value label, 0. If the image is also divided into four quarter-image sub-areas, then the image in each of the four quarters is represented by a respective node and assigned to level 1. Further, in accordance with the principles disclosed herein, the set of four level-1 nodes is indexed, or labeled, as nodes 1, 2, 3, and 4 in a z-ordering fashion. There are two possible z-orderings, as depicted in FIGS. 2A (ordering A) and 2B (ordering B, or complement of ordering A).

Figure 3:
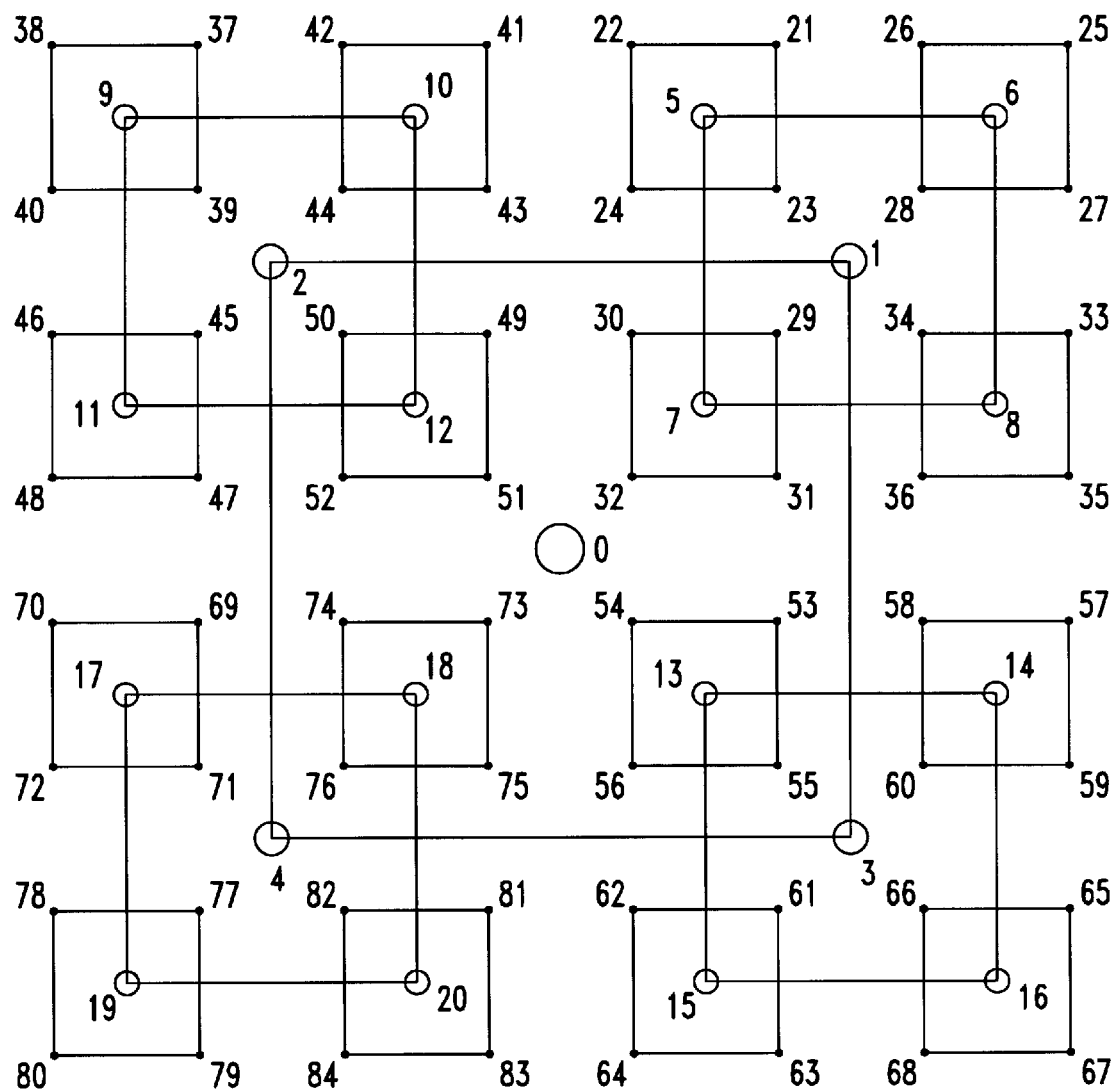
FIG. 3 shows all nodes of a 3-level quadtree.

As one might expect, each level-1 sub-area can be divided into four level-2 sub-areas, with the four level-2 sub-areas having corresponding level-2 nodes. Each foursome of the level-2 nodes is also labeled in a Bordering fashion. The labeling is done in the same sequence as that of the level-1 labeling, except that the z-ordering of the level-2 nodes is the complement z-ordering that is used in level-1 labeling. At the next iteration, the labeling of level-3 nodes is carried out with the complement of z-ordering of level-2 nodes, which is the same as the Bordering of level-1 nodes. Thus, the Bordering alternates from level to level between ordering A and its complement. A completed labeling for a 4-level quadtree is shown in FIG. 3, with the root node at the center. It may be observed that nodes in a given row, or column are nodes in the same level in the quadtree.

Because of the way the nodes are indexed in accordance with the principles disclosed above, the storing of information associated with each node can be quite simple: the label of each node corresponds to its address in memory (or row number in a table), and each address contains the entire set of information that is associated with the node.

A perusal of the FIG. 3 indexed nodes reveals that because of the way the nodes were indexed, the indices, or labels, of nodes in any column i are related to indices, or labels, of nodes in any other column j in a very interesting manner. To wit, the indices of nodes in any two columns for any pair of nodes in the same row differ by a constant. The same interesting relationship exists for rows. To wit, the indices of nodes in any two rows for any pair of nodes in the same column also differ by a constant. To illustrate, the difference between the index of a node in column 3 and the index of a node in column 4 on the same row is −1. Note, for example, the nodes with indices 42 and 41 or the nodes with indices 74 and 73. The difference between the index of a node in column 5 and the index of a node in column 4 on the same row is −19 (e.g. consider the nodes with indices 30 and 49, or nodes with indices 62 and 81.

Given that the information associated with the nodes stored in memory pursuant to the indexing arrangement disclosed above, the task that needs to be accomplished is to find the information stored for any specific node that an algorithm for processing the image may request. Of course, if the algorithm specifies that the information of node i is desired, then one needs to merely go to address i in the stored table. More likely, however, the algorithm will direct the retrieval of a "next subarea" to the west, to the north, to the east, or to the south. When traversing up or down a level, the algorithm would specify that also.

The challenge, then, is to identify the destination node given a specific instruction for traversing from an origin node to the destination node. Once the index of the destination node is determined, the appropriate information is easily obtained from memory by accessing the proper memory address.

A number of characteristics are readily ascertainable from the FIG. 3 quadtree.

A node having an index p has a parent node (immediate predecessor, up one level) with the index $$p_{parent} = \left\lfloor \frac{p-1}{4} \right\rfloor, \qquad (1)$$

where the operator ⌊ ⌋ is the "floor" operator, which yields the integer portion of the variable between the operator symbols.

The indices of children of a node p (immediate successors, down one level) are $$P_{children} = 4p+m, \text{ where } m=1, 2, 3, 4. \qquad (2)$$

The level of a node having index p is $$i = \lfloor \log_4(p+1) \rfloor. \qquad (3)$$

For example, applying the above to node p=13 identifies the node as a level-2 node that is a child of node 3 and has children nodes are 53, 54, 55, and 56. Node 3 is the level-1 predecessor node (parent of node 13), and node 0' is the level-0 predecessor node (grandparent of node 13).

Because of the recursive way the quadtree nodes are labeled, it is possible to derive a general expression for the local coordinates of a node, as well as the distance between nodes. To that end, we observe that the local index of a node p is $$p_{local} = p - \frac{4^i - 1}{3}, \qquad (4)$$

and we define matrices $$F_0 = 0, \quad F_1 = \begin{bmatrix} 1 & 0 \\ 0 & 0 \end{bmatrix}, \quad F_2 = \begin{bmatrix} 0 & 0 \\ 1 & 0 \end{bmatrix}, \quad F_3 = \begin{bmatrix} 1 & 0 \\ 0 & 1 \end{bmatrix}. \qquad (5)$$

Given the index of a node, p, its local coordinates (meaning, the coordinates in the grid that corresponds only to its level) are derived as follows:
1. Determine the level, i, of node p.
2. Compute the local index.
3. Express the local index as a base 4 number having i digits, where i is the level of p.
4. Flip every odd digit, starting with the most significant one from 0 to 1, 1 to 0, 2 to 3 and 3 to 2.
5. Compute $$\begin{bmatrix} n_x \\ n_y \end{bmatrix} = \sum_{j=0}^{i-1} F_{a_j} \begin{bmatrix} 2^j \\ 2^j \end{bmatrix},$$

where $n_x$ is the local x coordinate of node p, $n_y$ is the local y coordinate of node p, $a_j$ is the $j^{th}$ digit in the number derived in step 3 (where $a_0$ is the least significant digit).

To illustrate, consider computing the local coordinates of node 53.

1. $i = \lfloor \log_4(3p+1) \rfloor = \lfloor \log_4(3 \cdot 53+1) \rfloor = 3$ 2. $p_{local} = p - \frac{4^i - 1}{3} = 53 - \frac{4^3 - 1}{3} = 32$ 3. $P_{local} = (200)$ $4P_{local}^* = (301)$ ($P_{local}^*$ corresponds to the local coordinates, with the odd bits flipped)

Figure 4:
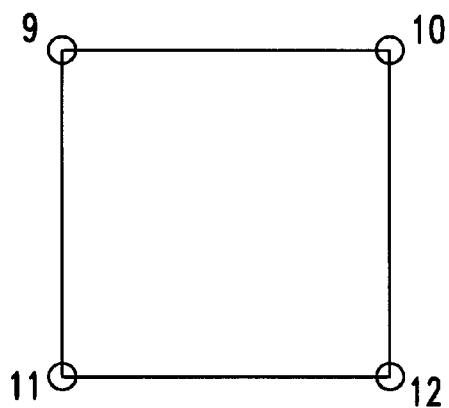
FIG. 4 illustrates the notion of local coordinates.
Figure 4:
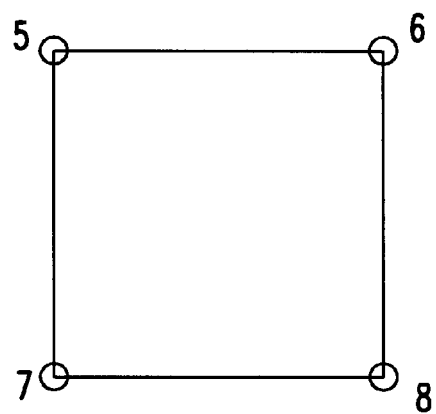
Figure 4:
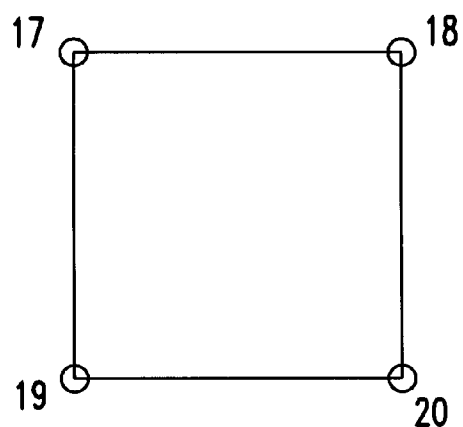
Figure 4:
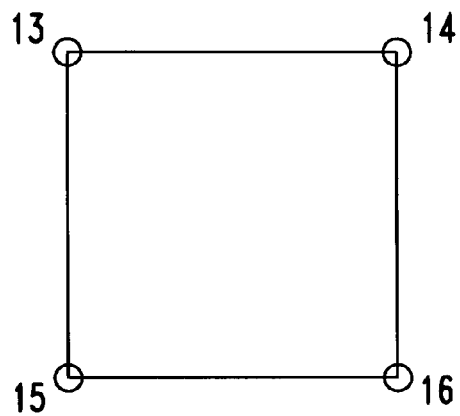

5. $\begin{bmatrix} n_x \\ n_y \end{bmatrix} = \sum_{j=0}^{i-1} F_{a_j} \begin{bmatrix} 2^{j-1} \\ 2^{j-1} \end{bmatrix}$ $= F_1 \begin{bmatrix} 1 \\ 1 \end{bmatrix} + F_0 \begin{bmatrix} 2 \\ 2 \end{bmatrix} + F_3 \begin{bmatrix} 4 \\ 4 \end{bmatrix}$ $= \begin{bmatrix} 1 \\ 0 \end{bmatrix} + 0 + \begin{bmatrix} 4 \\ 4 \end{bmatrix} = \begin{bmatrix} 5 \\ 4 \end{bmatrix}.$ FIG. 4 shows the level-2 mesh for FIG. 3 drawing and demonstrates that node 53 indeed has the coordinates $n_x=5$ and $n_y=4$.

Once the local coordinates of a given node are known, the index of a destination node to which one wishes to move from the given, origin, node can be ascertained. This can be generally accomplished by evaluating a Δh function and a Δv function, and applying this function to the $n_x$ and $n_y$ local coordinates of the destination node. The Δh and the Δv functions are different for different levels in the quadtree, and the evaluations of the $\Delta h^i$ and the $\Delta v^i$ functions for the different levels, i, can be pre-calculated in accordance with the following.

The horizontal indexing differences between columns of the quadtree, $\Delta h^i$, at level i, are given by $$\phi_1 = (-\delta_h(0)) \tag{6}$$

$$\Delta h^1 = (\delta_{th}(0)\ -\delta_h(0)\ \delta_{th}(0)) \tag{7}$$

$$\phi_1 = (-\phi_{i-1} - \delta_h(i-1) - \phi_{i-1}) \tag{8}$$

$$\Delta h^1 = (\delta_{th}(i-1)\ \phi_i \delta_{th}(i-1)) \tag{9}$$

where $$\delta_h(i) = \frac{6}{5}4^i + \frac{1}{5}(-1)^{i+1} \tag{10}$$

$$\delta_{th}(i) = \frac{4}{5}4^i + \frac{1}{5}(-1)^i, \text{ and}$$

$$v = \lfloor \log_4(3p+1) \rfloor.$$

The vertical indexing differences are given by $$\phi_1 = (\delta_v(0)) \tag{11}$$

$$\Delta v^1 = (-\delta_{tv}(0)\delta_v(0) - \delta_{tv}(0)) \tag{12}$$

$$\phi_i = (\phi_{i-1}\delta_v(i-1)\phi_{i-1}) \tag{13}$$

$$\Delta v^1 = (-\delta_{tv}(i=1)\phi - \delta_{tv}(i-1)), \tag{14}$$

where $$\delta_v(i) = \frac{4}{3}4^i + \frac{2}{3} \tag{15}$$

$$\delta_{th}(i) = \frac{2}{3}4^{i+1} - \frac{2}{3}.$$

For the 3 level quadtree of FIG. 3, it is advantageous to pre-compute the Δh and Δv function up to $\Delta h^3$, which is quite simple as shown by the tables below.

TABLE I

| i | $\delta_h$ | $\delta_{th}$ | $\delta_v$ | $\delta_{tv}$ |
|---|---|---|---|---|
| 0 | 1 | 1 | 2 | 2 |
| 1 | 5 | 3 | 6 | 10 |
| 2 | 19 | 13 | 22 | 42 |
| 3 | 77 | 51 | 86 | 170 |

TABLE II

| i | ∅ | Δh | φ | Δv |
|---|---|---|---|---|
| 0 |  |  |  |  |
| 1 | −1 | 1, −1, 1 | 2 | −2, 2, −2 |
| 2 | 1, −5, 1 | 3, 1, −5, 1, 3 | 2, 6, 2 | −10, 2, 6, 2, −10 |

TABLE II-continued

| i | ∅ | Δh | φ | Δv |
|---|---|---|---|---|
| 3 | −1, 5,−1, 19, −1, 5, −1 | 13, −1, 5, −1, 19, −1, 5, −1, 13 | 2, 6, 2, 22, 1, 6, 2 | +42, 2, 6, 2, 22, 2, 6, 2, −42 |

Having access to the different Δh and Δv functions, the index of a destination node can be computed with a relatively simple process. The specific equation that needs to be computed is a function of the destination node relative to the origin node, and skilled artisans can develop their own equations. The following presents a number of such equations and the approach for applying those equations.

To obtain the immediate west, east, north, and south neighboring nodes of a node in the same level, the indices are obtained by the following:

the index, k, of the western neighbor of p:

$$k = p - \Delta h^p[n_x] \tag{16}$$

where $\Delta h^p$ in the Δh for the level of p, and $\Delta h^p[n_x]$ means select the $n_x^{th}$ member of $\Delta h^p$, starting with the left-most member. To illustrate, consider node 8. Applying the above-described techniques, it can be determined that the local coordinates of node 8 are $n_x=3$ and $n_y=1$. Reviewing $\Delta h^2$ it can be seen that member 3 of the $\Delta h^2$ set (starting with the left-most member being 0) is 1. Applying equation (16) yields k=8−1=7. A perusal of FIG. 3 confirms that the western neighbor of node 8 is node 7.

The index, k, of the western neighbor of p is:

$$k = p + \Delta h^d[n_x+1] \tag{17}$$

For node 8, illustratively, k=8+$\Delta h^2$[4]=11.

The index, k, of the northern neighbor of p is:

$$k = p + \Delta v^d[n_y]. \tag{18}$$

For node 8, illustratively, k=8−$\Delta v^2$[1]=6.

The index, k of the southern neighbor of p is:

$$k = p - \Delta v^d[n_y+1]. \tag{19}$$

For node 8, illustratively, k=8−$\Delta v^2$[2]=12.

It may be noted that node 8 lies on the edge of the quadtree at is level. It does not, therefore, have an eastern neighbor. Consequently, considering the quadtree as a torus, the easterly neighbor of node 8 is, indeed, node 11.

The above equations represent the simplest situations but, fortuitously, these are also the most common situations in processing of images and other quadtree-structured data. Still, it is important to be able to carry out other transitions. Those transitions can be to:

(a) a node on the same level as the origin node but neither in the same column or the same row;

(b) a node at a lower level; or (c) a node at a higher level.

To move diagonally to the neighbor in the same level is akin to moving one step horizontally followed by moving one step vertically, or vice versa. The solution is the same regardless of which movement is taken first. Moreover, since the horizontal direction affects only n., and the vertical direction affects only $n_y$, it is easily seen that a single equation can be derived for the diagonal movement; that is:

$$k = p + \Delta h^d[n_x+1] - \Delta v^d[n_y]. \tag{20}$$

To move up a level is even easier, since the index of a parent is obtained directly from equation (1).

To move down a level, there are four directions that can be taken. For example, from node 13 one might wish to move to node 53, 54, 55, or 56. The index of the child node is, again, easily computable, since it follows equation (2).

To move down one level and then to move to a neighboring node, such as to move from node 13 to node 53 and then to the (diagonal) neighboring node 36, the equation that needs to be evaluated is:

$$k=p+(3p+1)+\Delta h^{d+1}[n_x+1]-\Delta v^{d+1}[2n_y-1] \qquad (21)$$

Generally speaking, regardless of the index of the origin node, an explicit equation can be created for traversal to any other node in the quadtree. It should be appreciated, however, that such an explicit expression is advantageous only when it is desired to absolutely minimize the computation time. Another way to get the index of the destination node it to employ the equations developed above in an iterative manner, as required. It is simply a case of computing the index by traversing from node to node, starting at the origin node and moving toward the destination node.

Figure 5:
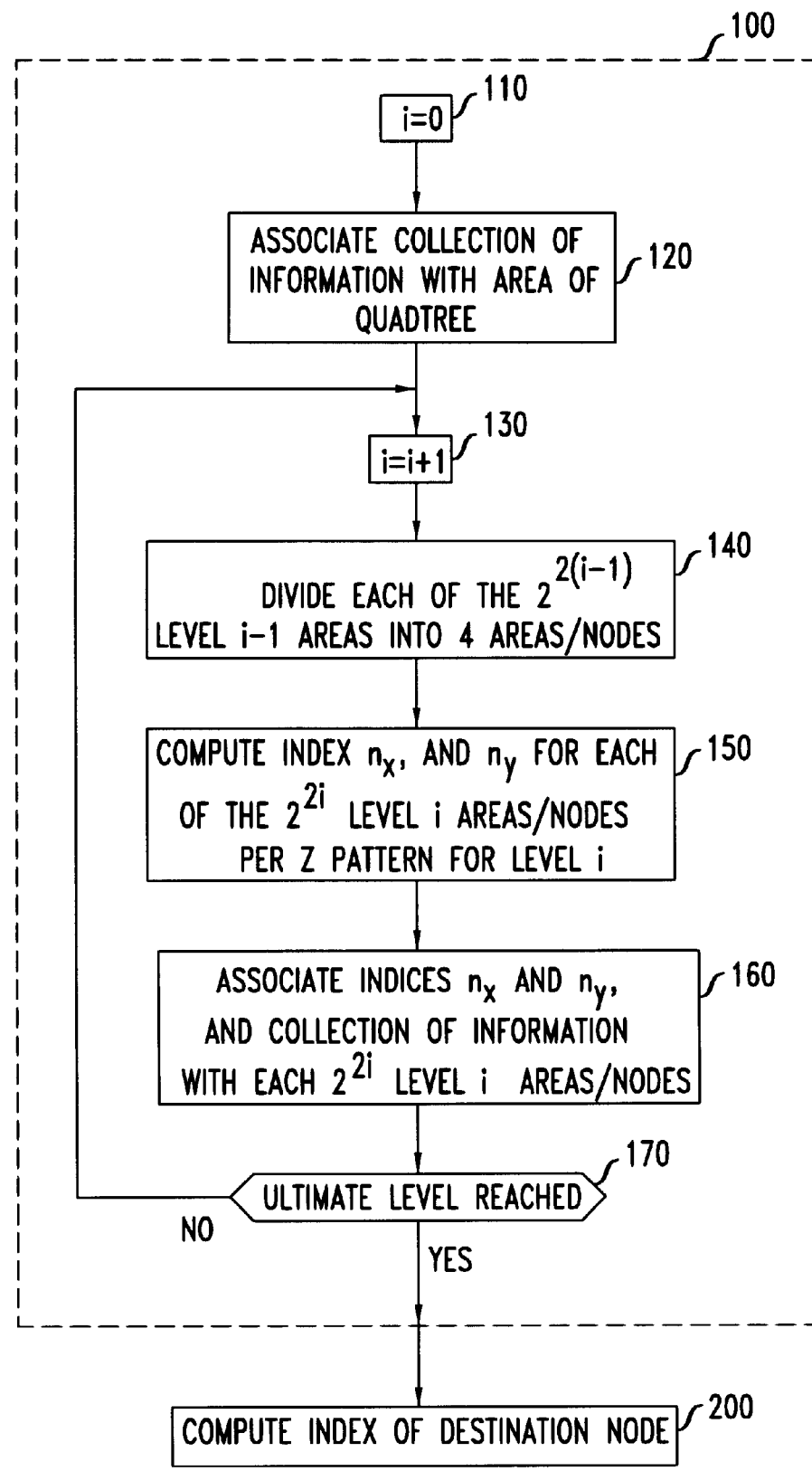
FIG. 5 presents a flow chart depicting the method of storing information about quadtree nodes in accordance with the principles disclosed herein, and for computing index of destination node.

FIG. 5 depicts a flowchart of the process disclosed above. Segment 100 of the flowchart relates to the creation of quadtree nodes, which represent the areas into which a picture is subdivided in the different levels and which have a computed set of indices that are associated therewith, in addition to a collection of picture information. Segment 200 relates to the computing of the index of a destination node, as disclosed above.

More particularly in connection with segment 100, the process begins at step 110 with the level, i, being set to 0. At step 120, a collection of information that is associated with the picture as a whole is associated with level 0. Thereafter, control passes to step 130 where the level index, i, is incremented by 1, and control passes to step 140. At step 140 each of the areas of the previous level is subdivided into 4 areas/nodes, as depicted in FIG. 1, and control passes to step 150. In step, 150, the x-coordinate index $n_x$ and the y-coordinate index $n_y$ are computed for each of the $2^{2i}$-level areas/nodes, in accord with the z pattern that is specific for the level, i, as disclosed above. Following the computation of the $n_x$ and $n_y$ indices, control passes to step 160, where a collection of information that is pertinent to each of the nodes is associated with the nodes, as are the indices $n_x$ and $n_y$. Lastly, control passes to step 170 where, if it is determined that computations for more levels (smaller areas) are needed, control returns to step 130.

What is claimed is:

1. A method for processing data having a quadtree topology comprising the steps of:

storing the data in memory, indexed for children nodes of a node to carry the indices 4p+i, where p is the index of said node, and i=1,2,3,4, and where the indices are assigned in a z-ordering of a first type, and where each child of said node, when such child, having an index p', has its own children, which are grandchildren nodes of said node, has said grandchildren indexed to carry the indices 4p'+j where j=1,2,3,4, where said indices of said grandchildren are assigned in a z-ordering of a second type; and traversing from one node of said quadtree to a destination node of said quadtree with a process that includes a single computation session that develops an index of said destination node, followed by an access to said data in said memory corresponding to said index of said destination node.

2. The method of claim 1 where said computation session that develops an index of said destination node comprises the steps of:

computing local coordinates of said one node of said quadtree, developing horizontal offset and vertical offset values that are related to quadtree level of said one node, and augmenting said local coordinates with said pre-computed horizontal offset and vertical offset values, to arrive at local coordinates of said destination node.

3. The method of claim 2 where said step of developing comprises accessing pre-computed values of said horizontal offset and vertical offset values.

4. The method of claim 2 wherein said step of computing local coordinates of said one node comprise the steps of:

determining level of said one node, computing a local index for said one node, developing a modified local index for said one node, and constructing coordinates of said one node from said modified local index.

5. The method of claim 4 wherein said step of developing a modified local index comprises the steps of:

expressing said local index in base 4 number system to develop a base 4 expression, and flipping every odd digit of said expressing, starting from the most significant digit, from 0 to 1, from 1 to 0, from 2 to 3, and from 3 to 2.

6. A method for storing information about an image comprising the steps of:

dividing said image into a quadtree of nodes, by creating a level 0 node at that encompasses entirety of said image, and corresponds to a level i of said quadtree of nodes being equal to 0, assigning index=0 to said level 0 node, dividing at least some node j having an index p at level i, where i>0 into four mutually exclusive subareas of said image, forming a NW level i+1 node, a NE level i+1 node, a SW level i+1 node, and a SE level i+1 node, said NW, NE, SW and SE nodes together represent the same area as represented by said node J, and assigning a unique index to each of said NW, NE, SW and SE nodes from a group of indices consisting of 4p+1, 4p+2, 4p+3 and 4p+4; and storing information about each node created pursuant to said step of dividing said image in association with the index assigned to said each node created pursuant to said step of dividing said image.

7. The method of claim 6 where said assigning a unique index follows the pattern of assigning index 4p+1 to said NW node, index 4p+2 to said NE node, index 4p+3 to said SW node, index 4p+4 to said SE node, when p is odd, and assigning index 4p+1 to said NE node, index 4p+2 to said NW node, index 4p+3 to said SE node, index 4p+4 to said SW node, when p is even.

8. The method of claim 6 where said assigning a unique index follows the pattern of assigning index 4p+1 to said NW node, index 4p+2 to said NE node,
index 4p+3 to said SW node,
index 4p+4 to said SE node,
when p is even, and assigning
index 4p+1 to said NE node,
index 4p+2 to said NW node,
index 4p+3 to said SE node,
index 4p+4 to said SW node,
when p is odd.

* * * * *